Oct. 26, 1926.
R. SIMPSON
1,604,611
ELECTRICAL MEASURING INSTRUMENT
Filed Nov. 21, 1923
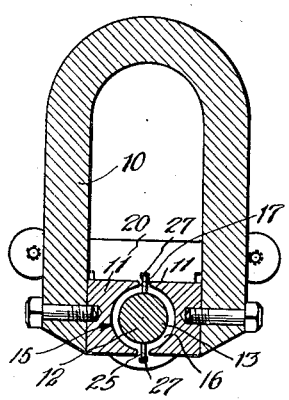
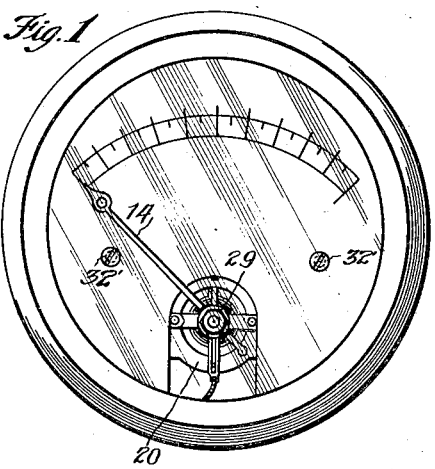
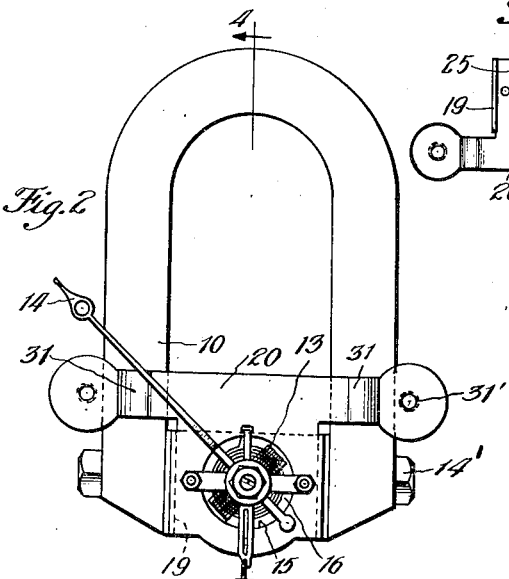
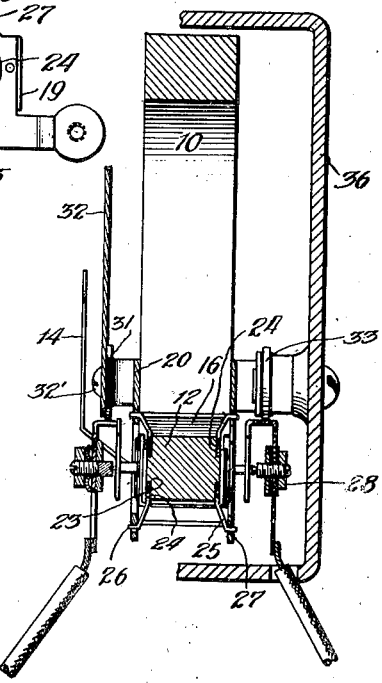
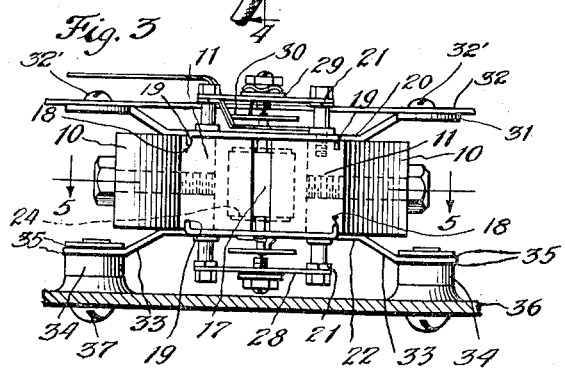
Inventor
Roy Simpson Patented Oct. 26, 1926.

1,604,611

UNITED STATES PATENT OFFICE.

RAY SIMPSON, OF OAK PARK, ILLINOIS, ASSIGNOR TO JEWELL ELECTRICAL INSTRUMENT COMPANY, OF CHICAGO, ILLINOIS, A CORPORATION OF ILLINOIS.

ELECTRICAL MEASURING INSTRUMENT.

Application filed November 21, 1923. Serial No. 676,017.

This invention relates to electrical measuring instruments and more especially to instruments of the permanent magnet and moving coil type. One object of my invention is the provision of improved means for securely holding in a definite spaced relation the pole-pieces of the magnet.

Another object of my invention is the provision of improved means for holding the core accurately centered with respect to the pole-pieces to maintain a uniform annular gap through which the movable coil rotates. Another object of my invention is to provide a construction which will allow the movable coil to rotate through a large arc.

A still further object of my invention is the provision of a spring or yielding means for supporting the core in its centered position, whereby an extreme accuracy in manufacturing the parts is not necessary. I also contemplate the provision of supporting arms for the coil, which are of a length sufficient to provide sufficient give in case the parts do not fit accurately in assembling.

Another object of my invention is an improved method of assembling an electrical instrument, whereby the parts will fit together properly, even though not accurately formed.

Many other objects, features and advantages in the construction of the instrument of my invention will become more apparent from the following description and claims and from the accompanying drawings, wherein—

Figure 1 is a front view of an instrument embodying the features of my invention;

Figure 2 is a similar view with the dial and housing removed, but on an enlarged scale;

Figure 3 is an end view of the structure of Figure 2;

Figure 4 is a longitudinal section taken on the line 4—4 of Figure 2;

Figure 5 is a plan section taken on the line 5—5 of Figure 3; and

Figure 6 is a detail of the securing plate shown on the same scale as Figure 1.

Similar characters of reference refer to similar parts throughout the drawings.

The instrument here shown comprises in general a horseshoe or U-shaped magnet 10, pole-pieces 11, a magnetic core 12, a movable coil 13 disposed about, and rotatable around the axis of, said core, and an indicating pointer 14 secured to the coil. Each pole-piece 11 is secured to one of the adjacent cheeks of the poles of the magnet by means of a cap screw 14'. The opposed faces of the pole-pieces are cut away cylindrically as indicated at 15 to provide an annular space 16 between the faces of the pole-pieces and the core 12 which is centered therebetween. It will be noted that there are gaps or spaces 17 left between the adjacent edges of the pole-pieces at either side of the core 12.

The top and bottom of each pole-piece 11 is provided with a groove 18 forming abutments extending close to and parallel with the adjacent cheek of the magnet. Into these grooves 18 on the top sides of the pole-pieces extend lateral flanges 19 of a plate 20, which extends across the top surface of the two pole-pieces and is secured thereto by means of threaded posts 21 tapped into the pole-pieces. At the bottom sides of the pole-pieces a similar nonmagnetic plate 22 is provided, also having flanges 19. It will thus be apparent that the pole-pieces 11 are held in accurately spaced relation, not primarily by the spacing of the ends of the magnet, but by means of the plates 20 and 22. It will further be observed that this spacing strain is borne by the flanges 19 across their entire length, thus relieving the threaded posts 21 of shearing strain when the pole-pieces are driven between the ends of the magnet in assembling.

The core 12, which is cylindrical in form, is shouldered at its ends to provide trunnions 23, over each of which is fitted a collar 24, the trunnion portion 23 being peened over to permanently secure the collar to the end of the core. Each collar 24 is provided with diametrically opposed arms 25 which, as shown in Figure 4, extend radially and are bent outwardly from the core and at their extremities are provided with tips 26, which are turned at a normal to the plane of the collar. Each of the plates 20 and 22 is provided with diametrically opposed apertures 27 for the reception of the offset tips 26 of the collar arms 25. It will be noted also that the arms 25 extend through the gaps 17 at the adjacent edges of the pole-pieces, whereby arms of longer length may be employed on the collars 24.

In assembling the device of my invention, the core 12 has previously been provided with the permanently attached collars 24, the arms of which extend in the same axial plane. A pair of pole-pieces 11—11 are also previously assembled to one of the plates, the plate 22 for instance. The flanges 19 of the plate 22 properly space the pole-pieces, the plate being secured to the pole-pieces by means of the threaded posts 21. If preferred, the lower bridge 28 which carries one of the bearings for the coil frame may also be assembled on the plate at this time, so that as much as possible of the assembling may be done while the device is small and easily handled. The core 12, with the coil 13 disposed about it, is then positioned between the pole-pieces with the offset tips 26 of the lower collar arms 25 extending into the apertures 27 of the lower plate 22. The upper plate 20 is then placed over the pole-pieces with the flanges 19 engaging the grooves 18 of the pole-pieces. The offset tips 26 of the upper collar 24 are at the same time introduced into the respective apertures 27 of the upper plate 20. The posts 21 are then screwed into the pole-pieces to clamp the upper plate 20 securely to the pole-pieces.

In case the supporting arms as assembled upon the core 12 make too long a core structure due to inaccurate forming of any of the several parts, the clamping of the plate 20 to the pole-pieces will tend to flatten the arms 25 a trifle, so that the core will be firmly held in position. However, inasmuch as all of the four arms will yield substantially equal amounts, the result is that the core will be centered between the pole-pieces just as accurately as though the several parts had been more accurately formed. It is also to be observed that this slight yielding quality of the arms is increased because of the length of the arms afforded by bringing the arms through the previously mentioned gap 17, making their reception by the plates 20 and 22 a greater distance from the axis of the core.

It will be observed further that the arms 25 are of very small width, so that the rotating of the coil 13 through a full 180 degrees is limited almost entirely by the width of the frame upon which the coil is wrapped.

After the posts 21 have been inserted through the upper plate 20 and screwed down, the upper bridge 29 with its associated bearings is assembled together with the hair-spring 30 and the needle 14 in the usual manner.

That portion of the plate 20 toward the arch of the magnet is provided with lateral arms 31, which are offset upwardly from the plane of the plate and are provided at their extremities with tapped holes 31'. The dial 32 of the instrument is supported on the upper surface of the arms 31 and secured thereto by screws 32', extending through the dial and threaded into the holes 31'. Since the coil 13 and its associated needle 14 are supported on the plate 20 by means of the bridge 29, the dial when thus supported by the arms 31 of the plate 20 will at all times remain in a constant relation to the axis of the coil, so that accurate readings may be insured during the life of the instrument.

On the bottom plate 22, similar arms 33 are provided which carry bosses 34 at their extremities, the bosses being insulated from the plate by washers 35. The bosses 34 rest upon the supporting back plate 36 of the instrument, the magnet and associated parts being secured to the back plate by means of screws 37 extending through the back plate and threaded into the bosses 34. This manner of mounting, it is obvious, provides a certain amount of spring suspension for the more delicate parts of the instrument, but does not interfere with the accurate readings thereof, inasmuch as the dial plate 32 moves as a unit with the magnet and its associated parts. It is also clear that the smaller and more delicate parts of the instrument may all be assembled in a convenient manner and may then be mounted by means of the screws 37 in the desired type of casing or housing, as occasion demands.

While I have thus described this particular embodiment of my invention, it is to be understood that certain changes in construction may be made therein without departing from the spirit or scope of my invention.

I claim:—

1. An electrical measuring instrument comprising in combination a field magnet, pole-pieces therefor, a dial, a magnetic core annularly spaced from said pole-pieces, a plate secured to said pole-pieces and supporting said dial, a collar secured to one end of said core, a pair of opposed arms extending from said collar, a pair of spaced slots in said plate, the ends of said arms entering said slots to support said collar from said plate in such annularly spaced relation to said pole-pieces, a coil lying in such annular space and rotatable around said core, and an indicator secured to said coil and cooperating with said dial.

2. In an electrical measuring instrument the combination of a U-shaped magnet, pole-pieces therefor, a cylindrical magnetic core between said pole-pieces, said pole-pieces being cut away to provide an annular space between said pole-pieces and said core, a plate secured to, and across the ends of, said pole-pieces, a collar centered on one end of said core, arms on said collar extending radially and longitudinally from said collar, recesses in said plate into which said arms fit, means for securing and centering the other end of said core, and an indicating coil rotatable in said annular space.

3. In an electrical measuring instrument, the combination of a field magnet, spaced pole pieces secured to the ends of said magnet, a relatively fixed magnetic core between and in spaced relation to said pole pieces, a plate holding said pole-pieces in spaced relation, supporting means extending between said plate and said core and passing between confronting tips of said pole pieces, and a coil rotatable around said core in the space between said core and said pole pieces.

4. In an electrical measuring instrument a U-shaped magnet, opposed pole-pieces secured respectively to the juxtaposed faces of the poles of said magnet, a core disposed between said pole-pieces and annularly spaced therefrom, a plate for supporting and centering said core relatively to said pole-pieces, co-operating centering means between said plate and said core, a groove in the lateral side of each of said pole pieces extending parallel with the said face of the associated pole, flanges on said plate entering said grooves respectively for holding said pole-pieces in spaced relation and for positioning said centering means, and means for securing said plate to said pole-pieces.

5. The combination of a pair of oppositely disposed pole-pieces of a magnet, a magnetic core disposed between said pole-pieces, said pole-pieces being cut away to provide an annular space between said core and said pole-pieces, a plate secured to and extending between said pole-pieces at one end thereof, a gap between each pair of juxtaposed edges of said pole-pieces, a centering member on said core, arms extending from said member and passing through said gaps respectively and being supported on said plate, and means for holding said core to press said arms against said plate.

6. In an electrical measuring instrument, the combination of a field magnet, pole pieces therefor, a relatively fixed core between said pole pieces, a plate spanning the gap between the adjacent edges of said pole pieces, supporting means extending between said plate and said core and passing through said gap, and a coil rotatable around said core in the space between said core and said pole pieces.

7. In an electrical measuring instrument, the combination of a field magnet, pole pieces therefor, a coil rotatably supported between said pole pieces, a stationary core supported between said pole pieces, each of said pole pieces having a slot therein, a plate extending across said pole pieces, flanges bent at an angle to said plate engaging in said slots, and means associated with said plate for supporting said core.

8. In an electrical measuring instrument, the combination of a field magnet, pole pieces therefor, each of said pole pieces having a slot therein, a plate extending across said pole pieces, flanges on said plate bent at an angle and engaging in said slots, and a coil rotatably supported between said pole pieces.

9. In an electrical measuring instrument, the combination of a field magnet, spaced pole pieces therefor, a plate holding said pole-pieces in spaced relation, abutments on said pole pieces, co-operating shoulders on said plate engaging the abutments on said pole pieces, said abutments and shoulders extending at an angle to the gap between said pole pieces whereby they function to predetermine and maintain the spacing between said pole pieces, and a coil rotatably supported between said pole pieces.

10. In an electrical measuring instrument, the combination of a field magnet, spaced pole pieces therefor, a plate holding said pole pieces in spaced relation, abutments on one of said pole pieces extending substantially at right angles to the width of the gap, a shoulder on said plate engaging said abutments, and a coil rotatably supported between said pole pieces.

11. In an electrical measuring instrument, the combination of a field magnet, pole pieces therefor, a stationary core supported between said pole pieces, a coil rotatably supported between said pole pieces and said core, each of said pole pieces having an abutment extending substantially at right angles to the direction in which the pole pieces are spaced, a plate bridging said pole pieces and having shoulders thereon engaging the abutments on said pole pieces said co-operating abutments and shoulders functioning to predetermine and maintain the spacing between said pole pieces, and supporting means associated with said plate for fixedly holding one end of said core.

12. In an electrical measuring instrument, the combination of a field magnet, pole pieces therefor, an armature element rotatably supported between said pole pieces, indicating means actuated by said armature element, a dial associated with said indicating means, recesses in said pole pieces, plates having flanges turned into said recesses, means for mounting said dial on one of said plates, a supporting member having a supporting surface disposed substantially parallel to said dial, and means for attaching one of said plates to said supporting surface.

13. In an electrical measuring instrument, the combination of a field magnet, pole pieces therefor, a stationary core supported between said pole pieces, a coil rotatably supported between said pole pieces and said core, each of said pole pieces having a slot cut across one face thereof, a plate of non-magnetic metal bridging said pole pieces and having flanges turned at an angle thereto and engaging in said slots, and supporting means associated with said plate for fixedly supporting said core.

In witness whereof, I hereunto subscribe my name this seventh day of November, 1923.

RAY SIMPSON.